United States Patent [19]

Hausler

[11] Patent Number: 5,486,926
[45] Date of Patent: Jan. 23, 1996

[54] METHOD AND A DEVICE FOR A HIGHLY ACCURATE MEASUREMENT OF DISTANCES, WHICH MAY CHANGE, IF A NECESSARY, BETWEEN AN OBJECT, FOR EXAMPLE A CLAMP WORKPIECE, AND A POINT OF REFERENCE

[75] Inventor: Gerd Hausler, Erlangen, Germany

[73] Assignee: MAHO Aktiengesellschaft, Germany

[21] Appl. No.: 22,652

[22] Filed: Mar. 1, 1993

[30] Foreign Application Priority Data

Mar. 2, 1992 [DE] Germany .......................... 42 06 499.6

[51] Int. Cl.⁶ ........................... G01B 11/14; G01B 11/00
[52] U.S. Cl. .................. 356/375; 356/372; 356/376
[58] Field of Search ........................... 356/372, 375, 356/376

[56] References Cited

U.S. PATENT DOCUMENTS

| | | | |
|---|---|---|---|
| 3,589,815 | 6/1971 | Hosterman | 356/167 |
| 3,745,566 | 7/1973 | Johnson | 343/5 R |
| 3,839,639 | 10/1974 | Hughes | 250/302 |
| 4,453,083 | 6/1984 | Bohlander et al. | 250/561 |
| 4,564,761 | 1/1986 | Buckwald et al. | 250/341 |
| 4,708,483 | 11/1987 | Lorenz | 356/376 |
| 4,823,014 | 4/1989 | Miyawaki | 356/375 |
| 4,936,676 | 6/1990 | Stauffer | 356/375 |
| 4,991,966 | 2/1991 | Raymond | 356/375 |
| 5,046,851 | 9/1991 | Morgan | 356/375 |

FOREIGN PATENT DOCUMENTS

| | | |
|---|---|---|
| 3342675 | 6/1985 | Germany . |
| 4006300 | 9/1990 | Germany . |
| 8103704 | 12/1981 | WIPO . |

*Primary Examiner*—Rolf Hille
*Assistant Examiner*—David Ostrowski
*Attorney, Agent, or Firm*—Weingarten, Schurgin, Gagnebin & Hayes

[57] ABSTRACT

A method and device is disclosed wherein a subject is excited by electromagnetic radiation in a locally limited range to emit radiation that is not coherent with the exciting radiation. The radiation of atoms lying close to one another on the surface of the subject is not correlated, i.e., the excited point of light radiates incoherently in space, and generally also in time. Since only this incoherent radiation emitted by the point of light is analyzed in distance determination, no speckle structure occurs in the point of light, which makes it possible more accurately to find the position of the point of light and thus also to find the distance much more accurately.

17 Claims, 6 Drawing Sheets

METHOD AND A DEVICE FOR A HIGHLY ACCURATE MEASUREMENT OF DISTANCES, WHICH MAY CHANGE, IF A NECESSARY, BETWEEN AN OBJECT, FOR EXAMPLE A CLAMP WORKPIECE, AND A POINT OF REFERENCE

FIELD OF THE INVENTION

The invention concerns a method of measuring distance.

BACKGROUND OF THE INVENTION

Various principles are known for accurately measuring distances between a subject, for example the surface of a clamped workpiece, and a reference point; these principles are used in interferometry, running-time methods, range-finding and triangulation (see T. C. Strand, "Optical Three-Dimensional Sensing for Machine Vision," Opt. Eng. 24, 33 (1985)). Since interferometry is not suitable for optically diffuse scattering surfaces, and running-time measurements are too inaccurate, most distance sensors used commercially are based on triangulation or range-finding. These two methods are physically similar and are also subject to the same physical limitations.

Figure 1:
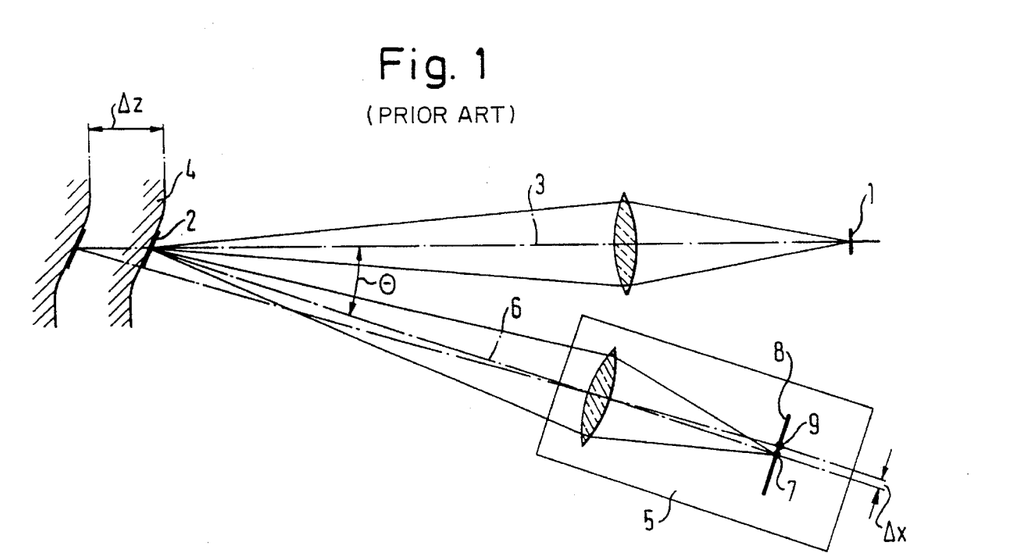
FIG. 1 shows the—known—principles of distance measurement by active triangulation.

The most common distance sensor is based on the principle shown schematically in FIG. 1. According to it, a point of light 2 is projected onto a subject 4 as an image of a light source 1 in the direction of the axis of illumination 3. The coherent light reflected from the surface of the subject is collected in a measuring head 5 in the direction of the axis of observation 6, which is inclined at a triangulation angle θ to the axis of illumination on a point of light 7 in a photodetector 8. The measuring distance is found by triangulation. Thus, a change in the distance from the surface of the subject to the point of light 2 along a line segment Δz causes a measurable lateral movement Δx of the point of light 7 to position 9.

Figure 2A:
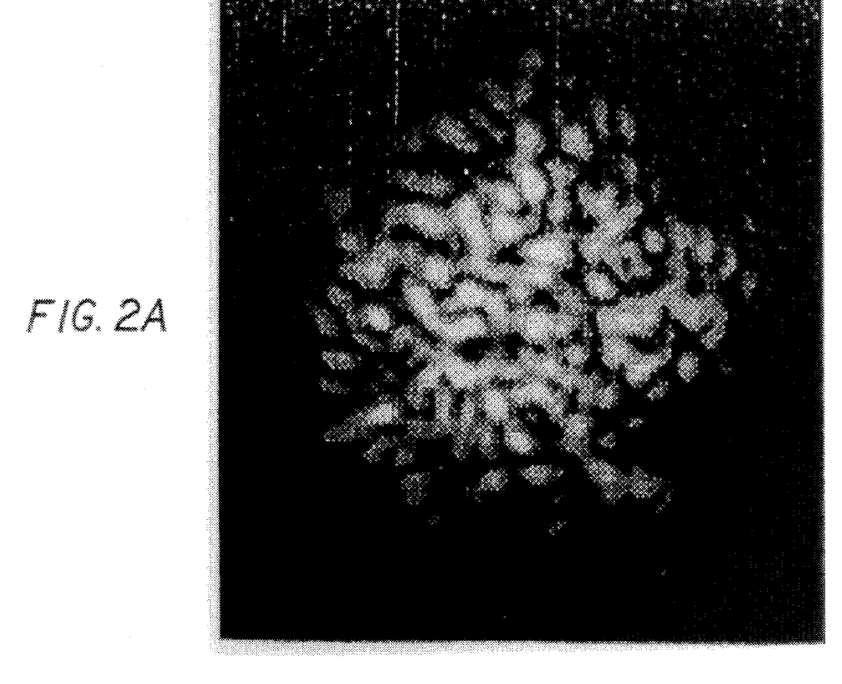
FIG. 2 shows a point of light interfered with by speckle structure for two different observation apertures; the image is obtained with the measuring method in FIG. 1.
Figure 2B:
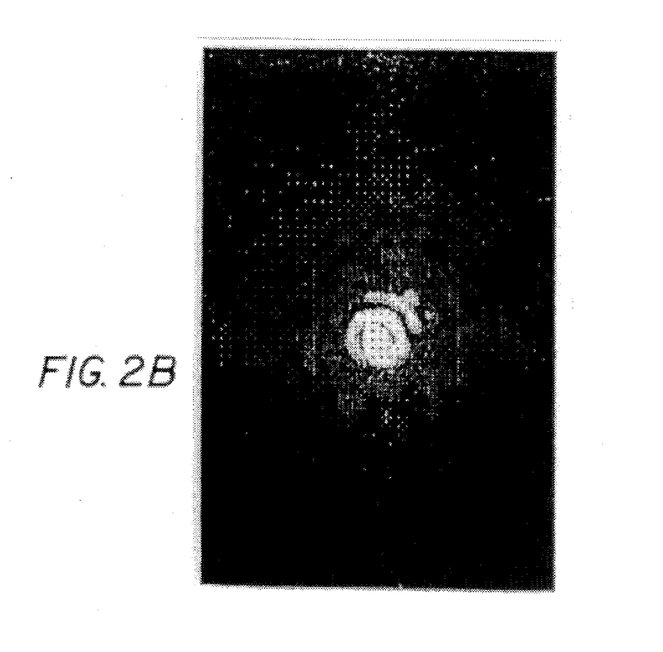

The accuracy of the distance determination is given by the accuracy in determining the point of light 7 and 9, but this has fundamentally physical limitations. The cause of these limitations is the statistical "speckle structure" of the point of light, as shown in FIG. 2. Speckle noises are basically created—even in light with so-called incoherent sources—because in the basic act of scattering, each excited atom emits light, whose phase is corrected with the phase of the exciting light, and the excited light and the scattered light are capable of interference or are "coherent with one another." This is also true when sunlight is scattered on subjects, just as it is with the known distance sensors. Because the coherence function becomes wider as the light spreads out, even the light of a light bulb is not completely spatially incoherent at the site where the surface of a subject is lighted, i.e., closely adjacent surface elements are lighted with their phases correlated. With coherent scattering, the diffuse reflected light of two adjacent points on a surface is almost always capable of interference.

The structure shown in FIG. 2 is determined by the respective microtopography of the surface of the subject and results in the fact that the respective point of light can only be detected with statistical uncertainty, which also affects the precision of the distance measurement. This connection and possible solutions are described in detail in DE-A-36 14 332, Wo 89/11 630 and DE-A-37 031 882.

It is also known (G. Häusler, "About fundamental limits of three-dimensional sensing," 15th Congress of the Int. Com. for Optics, Ed. F. Lanzl, 352 (1990)), that all methods that work with coherent light, run into the above-mentioned physical limit of accuracy, which is caused by the interaction of coherent light with the rough surfaces usual in mechanical engineering. The wave scattered on the subject has a phase that varies spatially and an intensity that fluctuates, which prevents localization of the scatter point above and beyond a certain limit of accuracy. This accuracy limit is basically given by the observation aperture:

$$\delta x \approx \lambda / \sin u \qquad (1)$$

Where δx stands for the statistical uncertainty (standard deviation) of the lateral localization of the point of light, λ the wavelength and sin u the observation aperture. In triangulation measurements, between which an angle of triangulation θ is used between the axis of the beam and the axis of observation, the lateral localization uncertainty leads to a measurement uncertainty δc regarding the distance:

$$\delta c \approx \lambda / (\sin u \cdot \sin \theta) \qquad (2)$$

In methods that are based on range-finding, the measuring uncertainty due to speckle is calculated by the equation (3):

$$\delta c \approx \lambda / \sin^2 u \qquad (3),$$

which corresponds to the classic Rayleigh field depth.

Equations (2) and (3) basically state that with coherent radiation, for a slight measuring uncertainty δc, a large observation aperture sin u is necessary and/or a large angle of triangulation θ. For a measuring uncertainty that must be under 10 μm, this leads to impractical angles μ and θ. For example, with a wavelength of λ=0.8, in order to have a measuring accuracy of δc=10 μm for range-finding, an aperture of sin u≈0.28 is needed, and hence an aperture angle of almost 30°. Such an angle may be practical for microscopic applications, but it leads to very large lenses. And the field of vision interferes with the marginal beams, i.e., you cannot see into holes.

It is still essential to decide between accuracy and resolution: If you point one of the sensors described above at a subject, the sensor will show a distance that is accurate within the tolerance given by the equations (2), (3). If the subject is moved a little way toward the sensor, the corresponding change in distance is indicated. Hence, the sensor shows quite good distance resolution. But this is not true of subject movements that are small against the visual field of observation, since then only the speckle structure remains.

Figure 3:
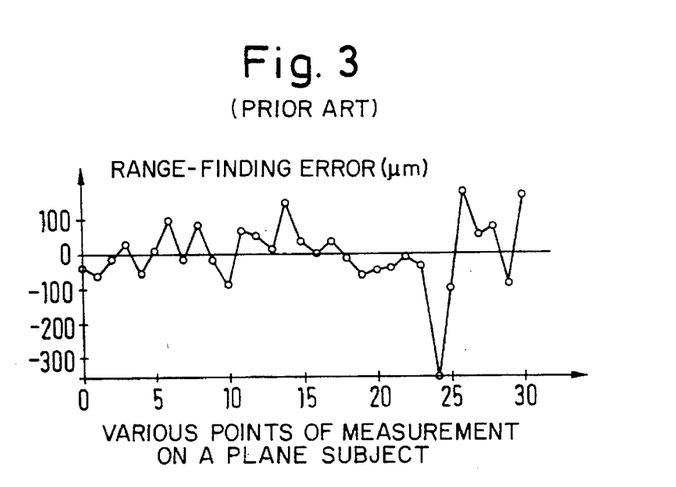
FIG. 3 shows a diagram of the unevenness simulated by speckle on an even surface.

But if a subject with a completely plane (but rough) surface is moved parallel to the surface of the plane, the sensor should show the same distance, regardless of the movement. But this is not the case. The sensor signal simulates the presence of a "rocky" surface, as shown in FIG. 3, with a standard deviation in height that is given by equation (2) or (3). This standard deviation δc is not the surface roughness of the subject, as is occasionally thought. δc has nothing to do with the microtopography of the surface, but is determined exclusively by a property of the instrument, the observation aperture, and can be a multiple of the surface roughness of the subject.

In order to avoid the speckle structure and thus a statistical measurement error, the beam used for measurement, which codes the distance should be largely spatially incoherent. But this cannot be achieved by reproducing a (small) incoherent point source, for example, a high-pressure mercury sheet on the subject. Because, according to the coherence theory, after reproduction, the width of the spatial coherence function on the subject is equal to the width of the diffraction pattern (point image) of the lighting optic (M. Born, E. Wolf, "Principles of Optics," Pergamon Press, New York, 1970). Thus, the image of even a very small incoherent source is always spatially coherent.

Extensive spatial incoherence in the point of light 2 can therefore be achieved only when the radiation source 1 reproduced on the subject has a large surface so that the point of light is also large in relation to the point image of the projection lens. But this has the disadvantage that you are no longer addressing a small point on the subject by lighting, but rather a large area, so that the lateral resolution is reduced. Also, a point of light with a large surface can only be located with less accuracy on the photodetector. It was also attempted (see DE-A-36 14 332 and W. Dremel, G. Häusler, M. Maul, "Triangulation with Large Dynamic Range," Optical Techniques for Industrial Inspection, Ed. G. Paolo, Proc. SPIE 665, 182 (1986)) to light the subject with a laser and to move the laser point of light over the subject during measurement. This is equivalent to lighting with a large incoherent light source and leads to the same problems. Another possibility is to let the laser point of light dance statistically on the subject by producing turbulence in the aperture diaphragm of the lens being used. This is also equivalent to the method above and does not yield the required measurement accuracy in the μm range. In other words, no spatially sufficient incoherent lighting can be achieved without the above-mentioned disadvantage of a large point of light. Temporally incoherent lighting is effective for speckle reduction only when the surface roughness of the subject is very large, which practically never exists in mechanical engineering.

The above-mentioned interference with high-accuracy distance determination by the "speckle structure" of the points of light obtained also exists with a measuring device known from DE-A-33 42 675 for optically scanning workpieces according to the triangulation principle. A point of light is projected by one or even two projectors at an angle to the surface of the measured subject, and the movement of the point of light that occurs when the distance from the subject changes is determined with a photosensitive detector. To increase the accuracy of the distance determination, besides the lateral movement of the image, the form and surface content of the point of light are measured by photoanalysis. But since the coherent radiation in the radiated point of light is analyzed, here again, measuring inaccuracies caused by the speckle structure of the point of light occur.

This also applies to the distance measurement devices known from DE-A-40 06 300 and U.S. Pat. No. 4,453,083.

SUMMARY OF THE INVENTION

The task of the invention is to indicate a method and a device for distance measurement in which the limitations of the state of the art are eliminated and with which highly accurate measuring results can be obtained with technically simple means.

According to the invention, the subject itself is excited by electromagnetic radiation in a locally limited range to emit radiation that is not coherent with the exciting radiation. Here, the radiation of atoms lying close to one another on the surface of the subject is not correlated, i.e., the excited point of light radiates incoherently in space, and generally also in time. Since, according to the invention, only this incoherent radiation emitted by the point of light is analyzed in distance determination, no speckle structure occurs in the point of light, which makes it possible more accurately to find the position of the point of light and thus also to find the distance much more accurately.

One convenient design is characterized by the fact that the subject in the point of light of the radiation source, for example, a laser, is heated locally so hot that it emits thermal (Planck) radiation, which is spatially and also temporally incoherent. Another possibility is the excitation of luminescence, which is composed of fluorescence and phosphorescence. Also included are Raman scattering, Brillouin scattering and other incoherent scattering mechanisms.

With a point of light produced on the subject, which emits this type of radiation, there is no longer any statistical measuring uncertainty due to speckle, so that it falls far short of the limits of measuring uncertainty given by the equations (2) and (3).

Other advantageous designs and variations of the invention are given in the subclaims.

Other peculiarities and advantages of the invention can be inferred from the following description of examples of embodiment and from the drawings.

DETAILED DESCRIPTION

Figure 4:
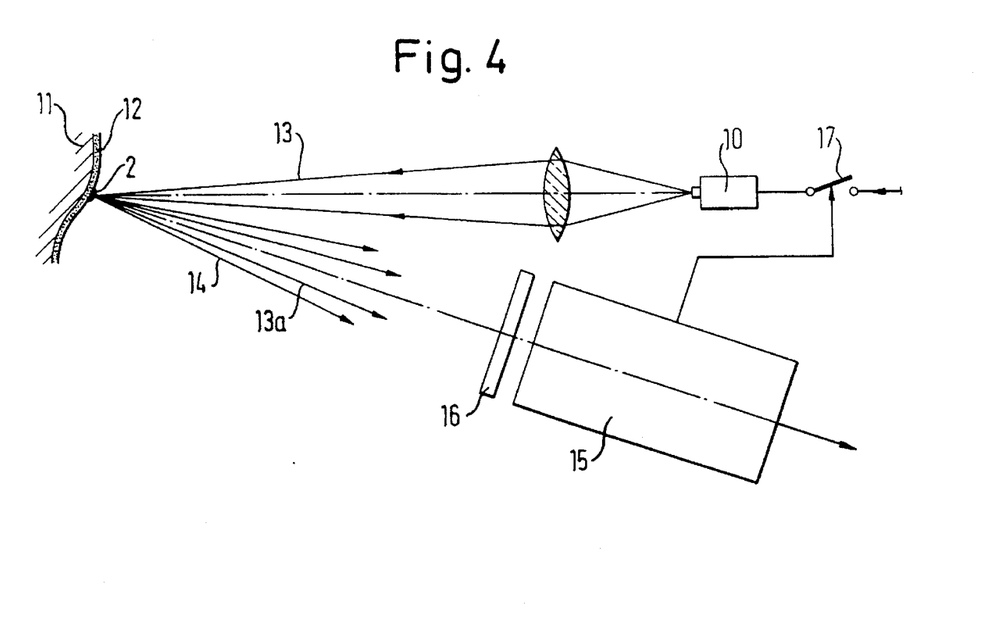
FIG. 4 shows the principle of distance measurement according to the invention.

As shown in FIG. 4, a point of light 2 is produced by a suitable small light source 10 in or on the subject 11. The light source 10 can be a thermal source, like a light bulb, a gas discharge lamp, a light-emitting diode, a gas or semiconductor laser, as well as a superluminescence diode. The important thing is that the radiation 13 of the light source 10 is suitable for exciting the surface of the subject in the point of light 2 to incoherent radiation 14. Many organic materials exhibit, for example, luminescence (fluorescence and phosphorescence) or Raman scattering or Brillouin scattering when they are excited at the right wavelength. If the subject emits no incoherent radiation, the surface can be activated by suitable treatment, for example, by coating it with appropriate phosphors 12. Often minor organic surface impurities are sufficient to excite the surface to incoherent emission.

If the measuring method in the invention is used for marking off a workpiece by means of a laser beam, the hot refractive spot produced in or on the subject by the laser beam emits the incoherent radiation necessary for distance measurement. Also, in other material-processing methods, like arc welding, the local heating of the surface of the subject is high enough for the emission of incoherent radiation.

The spatially incoherent radiation 14 emitted by the subject 11 is caught in a measuring head 15 and analyzed in order to determine the distance from the subject. Here, the coherent portion 13a of the beam 13 also emitted by the subject 11 is separated from the incoherent portion 14 of the radiation emitted before analysis. This separation is possible through an optical color filter 16, because the incoherent radiation is mostly in another wavelength from the coherent radiation. Another possibility is to choose the spectral sensitivity of the photodetector so that the portion of coherent radiation 13a is not detected. Another possibility is to interrupt the exciting radiation 13 after a certain time and not start analyzing the incoherent radiation 14 until after that. This possibility is shown symbolically in FIG. 4 by a switch 17 controlled by the measuring head 15 in front of the light source 10. Since the incoherent excited radiation can also be sent out with a delay, depending on the choice of material excited, the incoherent radiation can be analyzed within a time window, whose beginning and end are set advantageously.

Figure 5:
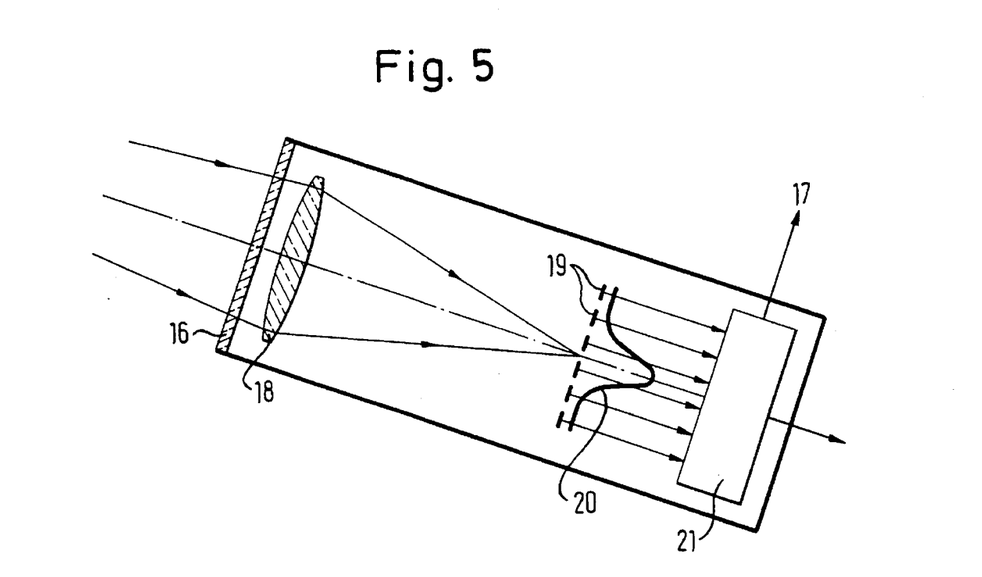
FIG. 5 shows a triangulation measuring head schematically.
Figure 6A:
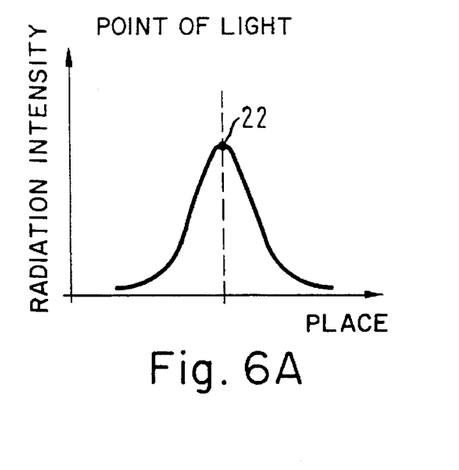
FIG. 6 shows measurement errors in the form of diagrams that occur with changes in the shape of the point of light.
Figure 6B:
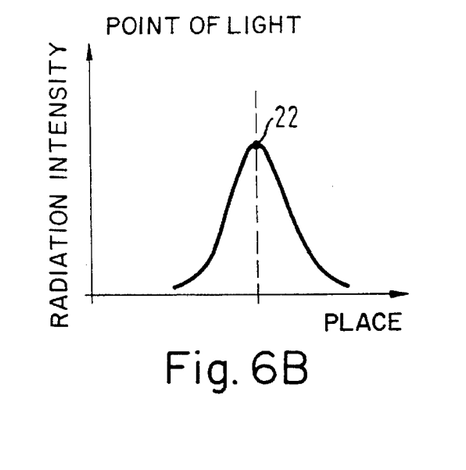
Figures 6C, 6D:
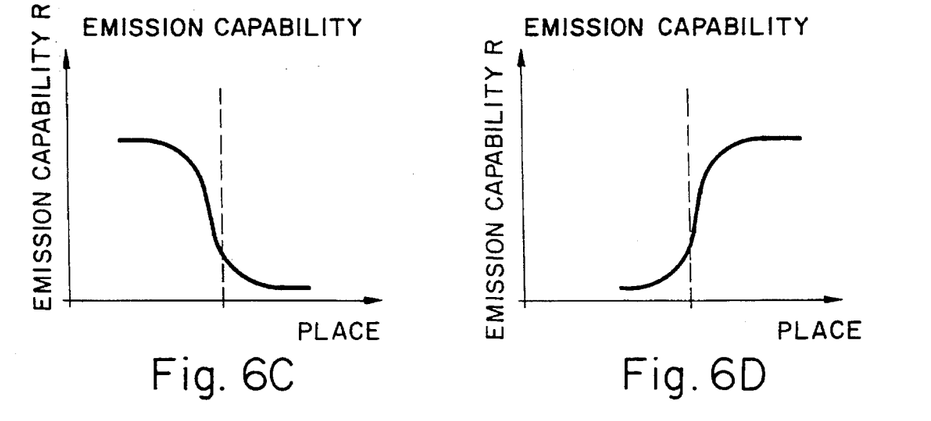
Figures 6E, 6F:
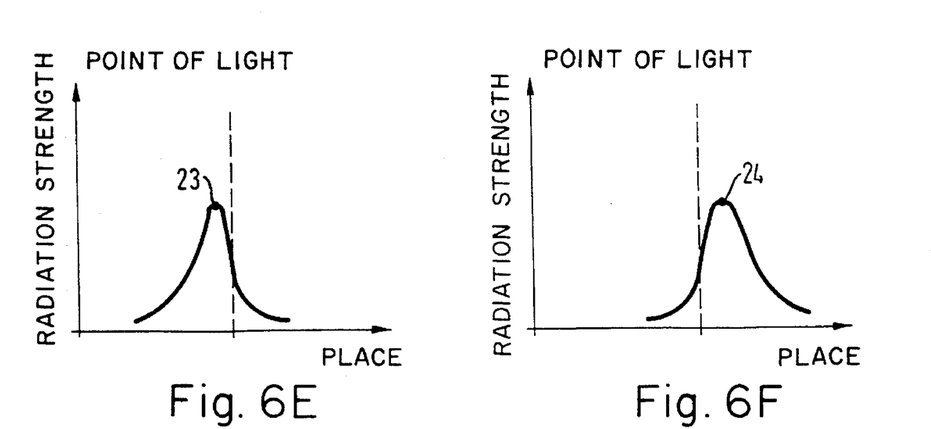

There are various possible embodiments of the measuring head 15, because the distance information that is in the emitted light can be decoded in various ways. FIGS. 4 and 5 show a triangulation measuring head as an example, which contains an image line 18 and a local resolution photodetector, preferably a "position-sensitive photodiode" (PSD) or a CCD photodiode array 19 shown in FIG. 5. FIG. 5 shows the individual diodes of such an array 19. The site of the point of light, whose intensity distribution at position 20 is shown as an example, codes the distance to the subject 11. According to the invention, the site of the point of light can now be determined with extreme accuracy, because the shape of the point of light is not statistically interfered with by speckle.

Therefore, the position of the point of light can also be determined much more accurately than its diameter or even more accurately than given by the distance from the CCD photodiodes. For example, the focus of the point of light can be found in the analyzer 21, or the point of maximum intensity, i.e., the vertex of the distribution curve 21, and these sizes can be determined by subpixel interpolation often more accurately than to within 1 μm in the plane of the photodetector. The analysis can be done in this case, so that the three or five highest photodiode signals are used to fit the measured values into a Gaus curve or another suitable curve. The location of the maximum on the curve is a measure of the position of the point of light. The potential accuracy is now influenced basically only by the noise of the photodetector.

Many other variations and designs of the measuring head are conceivable, two more embodiments of it are shown that offer other special advantages.

Methods of analyzing the position of a point of light are dependent on the fact that the shape of the point of light is independent from the place on the subject addressed and independent of the distance. This is clear in FIG. 6. If the subject, for example, has a local change in reflection or ability to emit R(x), the point of light looks different for place A than for place B. Finding the focal point would lead to slight measurement errors.

Such a local variation in the shape of the point of light, depending on the place addressed on the surface of the subject, cannot, however, be ruled out. There can no longer be local variation in reflection or ability to emit; the point of light itself can also vary spatially and temporally due to turbulence. The effect, inter alia, is small when the point of light is small, but because of the suppressed speckle and the high precision that can be achieved thereby, the shape of the point of light influencing the measuring result should not be ruled out. Since speckle is the main source of error in the known method, it was unnecessary in the past to pay attention to this effect.

Figure 7:
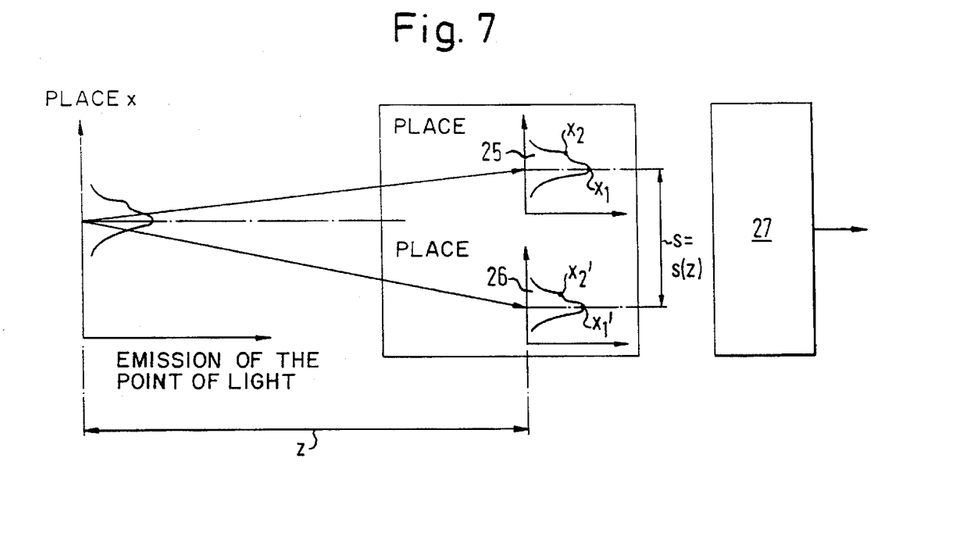
FIG. 7 shows, regardless of the shape of the point of light, a way of compensating for the measurement errors attributed to changes in the shape of the point of light.

The independence of the distance measurement from potential variations in the shape of the point of light is solved by the invention by the following method, as shown in FIG. 7, for example. In order to eliminate the influence of the shape of the point of light, according to FIG. 7, the place of the point of light itself is not found, but at least two identical points of light 25 and 26 are produced and the distance s between these two identical points of light 25, 26 is measured. Thus, it is possible in these images to find the distance s between characteristic homologous points $x_1$, $x_1'$ and $x_2$, $x_2'$ etc., as shown in FIG. 7. From the precise location of the homologous points, as can be determined in an analyzer 27, the distance s and thus the distance from the subject can be analyzed.

The homologous points can be local maxima or minima, for example. But the focal point of the point of light and the distance of the focal point from the various points of light can also be determined in order to find the distance of the subject from them. Also, a correlation can be made between the points of light 25, 26, and the distance s can be calculated from them in the known way.

But these ideas apply only to changes in the shape of the point of light that occur due to the coherence effect.

Figure 9:
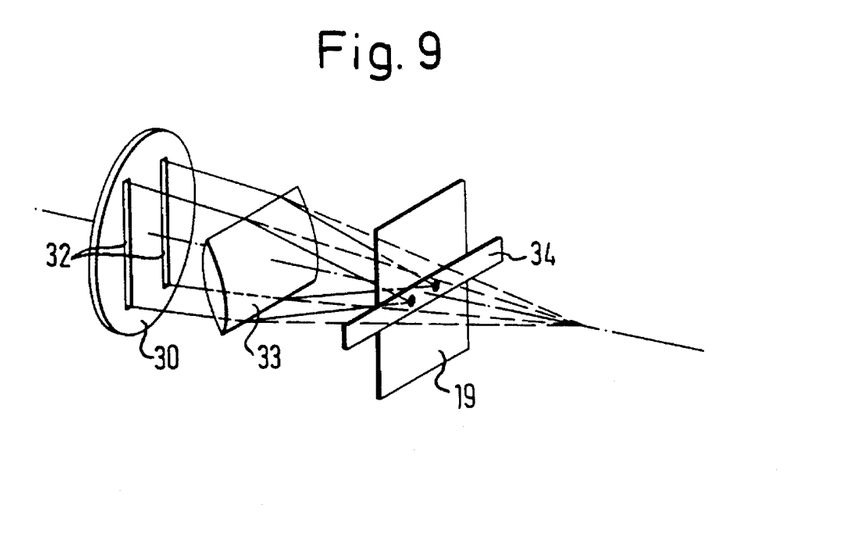
FIG. 9 shows a measurement arrangement with a double slit and a cylinder lens for incoherent measured radiation.
Figure 10:
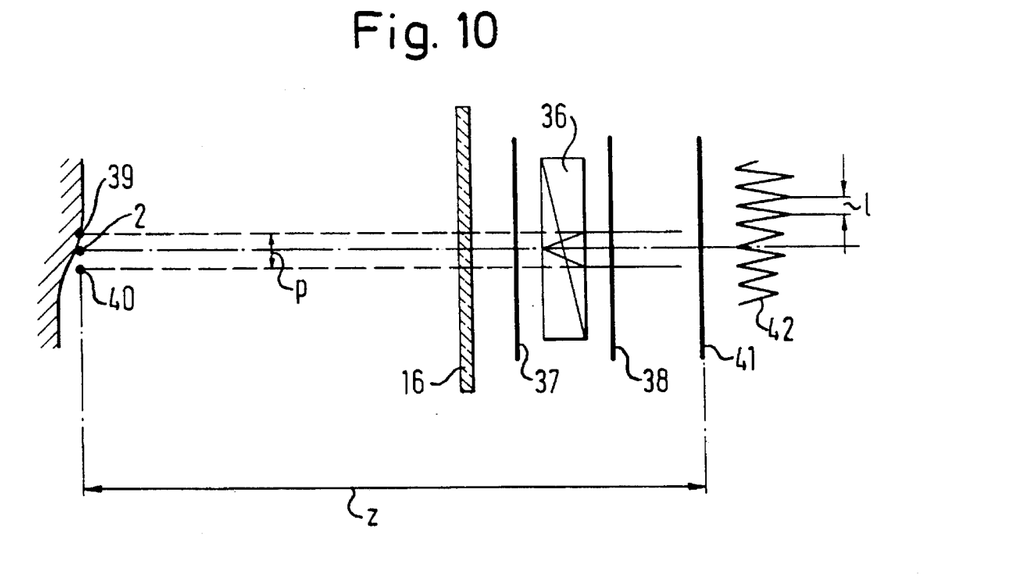
FIG. 10 shows a measurement arrangement with virtual light-spot duplication with a Savart plate.

The basic consideration in making the distance measurement independent from the shape of the light spot by finding not one position, but rather the difference between several positions, can be realized in various ways. Two embodiments of such a measuring device are shown in FIGS. 8 to 10.

Figure 8:
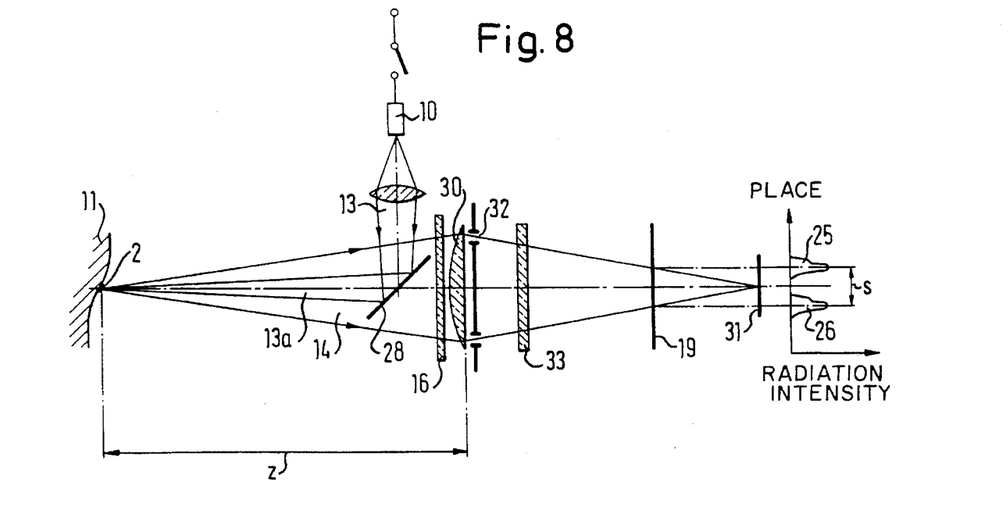
FIG. 8 shows a measurement arrangement for distance measurement independent of the shape of the point of light.

In the embodiment in FIG. 8, the radiation 13 produced in the light source 2 is reflected through a dividing mirror 28 to the subject 11. The incoherent radiation 14 re-emitted in the point of light 2 runs through the colored filter 16 and a collecting lens 30. Behind this collecting lens 30, there is a filter 32 with several openings spaced apart which is designed as a double slit in the embodiment in FIG. 8. Other filters with several spaced openings are also possible. The photodetector 19 here is positioned outside the plane of the focal point 31 of the collecting lens 18 in contrast to the device in FIG. 5. This creates two blurry points of light next to each other 25 and 26 at a distance s. In other words, an unclear projection of the filter is obtained. The distance s of the blurry light filter depends on the distance z of the point of light 2 from the lens 30. The change in distance Δs of the blurry points of light 25, 26 can be calculated as follows.

The following symbols are used:

s distance of the blurry points of light

Δ change in distance of points of light z distance of point of light 2 from lens 30 (subject width);

b distance of image from lens (image width);

D distance of slit in aperture diaphragm;

A distance of detector plane to lens;

a defocusing (intrafocal), detector plane distance;

β scale of reproduction, β=b/z;

f focal length of lens.

Thus the following equation can be set up $$D/b = s/a \quad (4);$$

using θ=b−A and b=z·β gives:

$$s = D + (A \cdot D)/(z - \beta) \quad (5).$$

This equation is differentiated according to z:

$$\frac{\delta s}{\delta e} = -\frac{A \cdot D}{z^2 \cdot \beta} \Rightarrow \Delta s = -\frac{A \cdot D}{z^2 \cdot \beta} \Delta z. \quad (6)$$

The following equation also applies to the figure:

$$1/f = 1/b - 1/z \quad (7).$$

−z·β is used for b and then solved for z; this gives $$z = -f - f/\beta \quad (8).$$

After some conversions, using it in equation (3) gives:

$$\Delta s = -\frac{A \cdot D}{f^2(\beta + 2 + \beta^{-1})} \Delta z. \quad (9)$$

This relative change in distance, which is a measurement of the sensitivity of the method, reaches its optimum on a scale of β=−1. This can be shown from the equation (6). The smaller the denominator, the larger the change in distance Δs. So it must be found when $\gamma(\beta)=\beta+2+\beta^{-1}$ is the minimum. This is true of $\beta_0$ with $\gamma'(\beta_0)=0$. The first derivation of $\gamma(\beta)$ is $$\gamma'(\beta) = 1 - \beta^{-2} \quad (10).$$

The zero positions are at $\beta_0 = \pm 1$. β=−1 is physically relevant. Since γ"(−1) is greater than 0, for β=−1, γ will be actually minimal, i.e., Δs will be maximal. This is used in the invention.

Another extremely important property of the arrangement is that the blurry points of light 25, 26 are not mirror-symmetrical to the optical axis, but have the same orientation as shown in FIG. 8, so that the distance from homologous points is independent of the shape.

Since the blurry points of light 25, 26 also appear as blurry projections of the aperture diaphragm, they are slit-shaped in the above example. This is somewhat of a disadvantage, since the photodetector then has to cover a large surface so that all the light is caught. It is less expensive and better for fast analysis to use a photodiode line which is used with a cylinder-collecting lens 33 shown in FIG. 8. This cylinder collecting lens 33 is oriented so that the blurry gap projections are pulled together approximately at one point, as shown in FIG. 9. This way, a line-shaped photodetector can be used instead of a surface photodetector without losses.

Another design for producing two or more identical points of light, whose mutual distance depends on the subject distance, is created by using a double refracting element, through which the light from the point of light passes. In such a measuring device, shown in FIG. 10, the incoherent radiation produced in the point of light 2 goes through, for example, a Savart plate 36, with a polarizer 37 connected in front of it and a polarizer 38 connected in back of it. This arrangement produces two virtual duplicate images of the point of light at places 39 and 40, at a distance p, which is given by the Savart plate 36. The light of these double images becomes interference in a plane 41 behind the Savart plate. Interference bands 42 can be observed there. The distance between the interference bands depends on the distance z between the measuring plane 26 and the point of light 20 according to the relation =zλ/p. The distance between the interference bands is found, and the distance from the subject is derived from it. The invention's use of spatially incoherent radiation achieves an improvement in accuracy on the order of magnitudes. Likewise the embodiment in FIG. 8 gives the added advantage of great symmetry, i.e., observation and lighting from the same direction, and thus a lower incidence of error, as well as less fading.

Thus, a small observation aperture can be chose. No asymmetry occurs, as it does in the usual triangulation, and the lighting direction is the same as the observation direction. There is only very minor fading.

I claim:

1. A method for distance measurement between a subject and a point of reference said method comprising the steps of:

exposing said subject at a point of light, to electromagnetic radiation from a radiation source to excite said subject with said electromagnetic radiation to emit spatially incoherent radiation;

finding a distance between said subject and said point of reference by:

capturing radiation coming from said point of light with a measuring head;

separating said spatially incoherent radiation emitted at said subject from said radiation coming from said point of light; and determining said distance between said subject and said point of reference using said spatially incoherent radiation emitted by said subject.

2. A method according to claim 1, wherein the subject in the point of light is heated by electromagnetic radiation and is excited to emit spatially incoherent thermal radiation.

3. A method according to claim 1, wherein the surface of the subject in the point of light is excited by the electromagnetic radiation to emit non-thermal spatially incoherent radiation, selected from a group consisting of luminescence, fluorescence, phosphorescence, Raman scattering and Brillouin scattering.

4. A method according to claim 1, wherein coherent radiation coming from the point of light is separated from the spatially incoherent radiation by suppression.

5. A method according to claim 1, wherein the radiation source operates on pulses, and radiation re-emitted on the point of light is detected only in pauses between pulses.

6. A method according to claim 1, wherein in finding the distance independently of shape and position of the point of light, at least two points of light next to one another are produced and the distance between the subject and the point of reference is found from an intermediate distance between homologous points in the at least two points of light.

7. A method according to claim 6, wherein the distance between focal points of the at least two points of light is analyzed by finding the distance from the subject.

8. A method according to claim 6, wherein through interpolation, the maxima of the at least two points of light are found, and the distance from the subject is found from a distance between these two maxima.

9. A device for measuring distance between a subject and a point of reference, comprising:

an electromagnetic radiation source with at least one focusing element which produces a local point of light on a surface of the subject, said electromagnetic radiation source being adjustable to the subject to emit spatially incoherent radiation at the local point of light;

a measuring head which detects radiation coming from the local point of light, said measuring head including at least one selection element that passes substantially only the spatially incoherent radiation emitted at the local point of light; and at least one computing element receiving information relating to the spatially incoherent radiation emitted at the local point of light and calculating a distance between the subject and the point of reference therefrom.

10. A device according to claim 9, wherein said at least one selection element of the measuring head contains an optical colored filter which absorbs coherent radiation coming from the local point of light.

11. A device according to claim 9, wherein said at least one selection element of the measuring head includes a photodetector which detects substantially only the wavelength of incoherent re-emitted radiation.

12. A device according to claim 9, wherein the measuring head is coupled to the electromagnetic radiation source via a clock unit which activates spatially incoherent radiation analyzer elements only when the radiation source is turned off.

13. A device according to claim 9, wherein the measuring head contains optical elements and computing elements which detect the distance from the subject independently of fluctuations in the shape, size and position of the point of light.

14. A device according to claim 9, wherein the measuring head contains optical elements that produce at least two substantially identical points of light and analysis elements that determine one point each in one of these points of light, detect the distance between corresponding homologous points and send it to an analyzer that uses it to calculate the distance from the subject to the point of reference.

15. A device according to claim 9, wherein the electromagnetic radiation source is arranged at an angle to a surface of the subject, a dividing mirror is arranged in a radiation path between the electromagnetic radiation source and the subject and a double slit is arranged behind the dividing mirror in a radiation path of spatially incoherent radiation emitted by the point of light.

16. A device according to claim 14, wherein a cylindrical collecting lens is arranged between the optical elements producing the at least two substantially identical points of light.

17. A device according to claim 9, wherein a double-refracting optical element is arranged in a radiation path of spatially incoherent radiation emitted by the point of light to produce several points of light.

\* \* \* \* \*